(12) United States Patent
Winger

(10) Patent No.: US 7,801,223 B2
(45) Date of Patent: Sep. 21, 2010

(54) METHOD FOR VIDEO DECODER MEMORY REDUCTION

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 375 days.

(21) Appl. No.: 11/494,105

(22) Filed: Jul. 27, 2006

(65) Prior Publication Data

US 2008/0025407 A1    Jan. 31, 2008

(51) Int. Cl.
*H04N 7/18* (2006.01)
(52) U.S. Cl. .............................. 375/240.25; 375/240.21
(58) Field of Classification Search .................................. 375/240.01–240.29
See application file for complete search history.

(56) References Cited

U.S. PATENT DOCUMENTS

| 5,724,475 | A | * | 3/1998 | Kirsten | 386/109 |
| 5,818,530 | A | * | 10/1998 | Canfield et al. | 348/400.1 |
| 6,081,551 | A | * | 6/2000 | Etoh | 375/240 |
| 6,222,944 | B1 | * | 4/2001 | Li et al. | 382/250 |
| 6,487,248 | B1 | * | 11/2002 | Lim et al. | 375/240.12 |

* cited by examiner

*Primary Examiner*—Andy S Rao
(74) *Attorney, Agent, or Firm*—Christopher P. Maiorana, PC

(57) ABSTRACT

A method for video decoding is disclosed. The method generally includes the steps of (A) decoding a first picture from a bitstream, the first picture having a first resolution, (B) storing the first picture at the first resolution in a memory and (C) storing the first picture at a second resolution in the memory, wherein the second resolution is lower than the first resolution.

22 Claims, 11 Drawing Sheets

| Method: discard oldest | | | | | | | | IPPP.. stream', 4 ref. pictures |
|---|---|---|---|---|---|---|---|---|
| decode | I0 | P0 | P1 | P2 | P3 | P4 | P5 | .. | RF DRIFT for DPB size |
| display (delayed) | I0 | P0 | P1 | P2 | P3 | P4 | P5 | .. | |
| Rec. min DPB=1 | | I0 | P0 | P1 | P2 | P3 | P4 | .. | >= P1 |
| DBP>=2 buffer | | | I0 | P0 | P1 | P2 | P3 | .. | >= P2 |
| DPB>=3 buffer | | | | I0 | P0 | P1 | P2 | .. | >= P3 |
| DPB==4 buffer | | | | | I0 | P0 | P1 | .. | no RF drift |

FIG. 2 potential resolution reduction drift for >=P3 for all examples.

| Method: dynamically reduce oldest half-horizontal resolution | | | | | | | | IPPP.. stream, 4 ref. pictures |
|---|---|---|---|---|---|---|---|---|
| decode | I0 | P0 | P1 | P2 | P3 | P4 | P5 | .. |
| display (delayed) | I0 | P0 | P1 | P2 | P3 | P4 | P5 | .. |
| DPB=3 buffer | | I0 | P0 | P1 | P2 | P3 | P4 | .. |
| (do DPB=3.5 in | | | I0 | P0 | P1 | P2 | P3 | .. |
| similar way to 3 | | | | I0 | hP0 | hP1 | hP2 | .. |
| & 2.5) | | | | | hI0 | hP0 | hP1 | .. |

FIG. 3 potential resolution reduction drift for >=P2 for all examples.

| Method: dynamically reduce oldest half-horizontal resolution | | | | | | | | IPPP.. stream, 4 ref. pictures |
|---|---|---|---|---|---|---|---|---|
| decode | I0 | P0 | P1 | P2 | P3 | P4 | P5 | .. |
| display (delayed) | I0 | P0 | P1 | P2 | P3 | P4 | P5 | .. |
| DPB=2.5 buffer | | I0 | P0 | P1 | P2 | P3 | P4 | .. |
| | | | I0 | P0 | hP1 | hP2 | hP3 | .. |
| | | | | I0 | hP0 | hP1 | hP2 | .. |
| | | | | | hI0 | hP0 | hP1 | .. |

FIG. 4

Resolution reduction drift for >=I0 for all examples

| Method: reduce all half-horizontal resolution & discard oldest | IPPP.. stream, 4 ref. pictures | | | | | | | |
|---|---|---|---|---|---|---|---|---|
| decode | I0 | P0 | P1 | P2 | P3 | P4 | P5 | .. | RF DRIFT for DPB size |
| display (delayed) | I0 | P0 | P1 | P2 | P3 | P4 | P5 | .. | |
| Rec. min DPB=.5 | | hI0 | hP0 | hP1 | P2 | P3 | P4 | .. | >=P1 |
| DBP>=1 buffer | | | hI0 | hP0 | hP1 | hP2 | hP3 | .. | >=P2 |
| DPB>=1.5 buff | | | | hI0 | hP0 | hP1 | hP2 | .. | >=P3 |
| DPB==2 buffer | | | | | hI0 | hP0 | hP1 | .. | no RF drift |

FIG. 5

| Method: discard oldest | IBBPBBP.. frame stream, 4 ref. frames. | | | | | | | | | | |
|---|---|---|---|---|---|---|---|---|---|---|---|
| decode | I0 | P0 | B0 | B1 | P1 | B2 | B3 | P2 | B4 | B5 | P3 | .. | RF DRIFT |
| display (delayed) | | I0 | B0 | B1 | P0 | B2 | B3 | P1 | B4 | B5 | P2 | .. | |
| Rec. min. DPB=2 | | I0 | P0 | P0 | P0 | P1 | P1 | P1 | P2 | P2 | P2 | .. | B2,B3,P2,... |
| | | | I0 | I0 | I0 | P0 | P0 | P0 | P1 | P1 | P1 | .. | |
| DPB>=3 buffer | | | | | I0 | I0 | I0 | P0 | P0 | P0 | .. | B4,B5,P3,... |
| DPB==4 buffer | | | | | | | | I0 | I0 | I0 | .. | No drift |

FIG. 6 potential resolution reduction drift for decoded frames >= P3 (with Bluray restrictions). Without Bluray restrictions, for decoded frames >=B4.

| Method: dynamically reduce oldest half-horizontal resolution | H.264 'IBBP-frame stream', 4 ref. frames. | | | | | | | | | |
|---|---|---|---|---|---|---|---|---|---|---|
| Decode | I0 | P0 | B0 | B1 | P1 | B2 | B3 | P2 | B4 | B5 | P3 | .. |
| display delayed) | | I0 | B0 | B1 | P0 | B2 | B3 | P1 | B4 | B5 | P2 | .. |
| DPB=3 buffer (do DPB=3.5 in similar way to 3 & 2.5) | | I0 | P0 | P0 | P0 | P1 | P1 | P1 | P2 | P2 | P2 | .. |
| | | | I0 | I0 | I0 | P0 | P0 | P0 | P1 | P1 | P1 | .. |
| | | | | | | | | I0 | I0 | I0 | hP0 | hP0 | hP0 | .. |
| | | | | | | | | | | | hI0 | hI0 | hI0 | .. |

FIG. 7 potential resolution reduction drift for decoded frames >= P2 (with Bluray restrictions). Without Bluray restrictions, for decoded frames >=B2.

| Method: dynamically reduce oldest half-horizontal resolution | H.264 'IBBP-frame stream', 4 ref. frames. | | | | | | | | | | |
|---|---|---|---|---|---|---|---|---|---|---|---|
| decode | I0 | P0 | B0 | B1 | P1 | B2 | B3 | P2 | B4 | B5 | P3 | .. |
| display (delayed) | | I0 | B0 | B1 | P0 | B2 | B3 | P1 | B4 | B5 | P2 | .. |
| DPB=2.5 | | I0 | P0 | P0 | P0 | P1 | P1 | P1 | P2 | P2 | P2 | .. |
| | | | I0 | I0 | I0 | P0 | P0 | P0 | hP1 | hP1 | hP1 | .. |
| | | | | | | hI0 | hI0 | hI0 | hP0 | hP0 | hP0 | .. |
| | | | | | | | | | hI0 | hI0 | hI0 | .. |

FIG. 8

Resolution reduction drift for >=I0 for all examples. Reference frame drift as for 'discard oldest' example.

| Method: reduce all half-horizontal resolution & discard oldest | H.264 'IBBP-frame stream', 4 ref. frames. | | | | | | | | | | |
|---|---|---|---|---|---|---|---|---|---|---|---|
| decode | I0 | P0 | B0 | B1 | P1 | B2 | B3 | P2 | B4 | B5 | P3 | .. |
| delayed display | | I0 | B0 | B1 | P0 | B2 | B3 | P1 | B4 | B5 | P2 | .. |
| rec. min | | hI0 | hP0 | hP0 | hP0 | hP1 | hP1 | hP1 | hP2 | hP2 | hP2 | .. |
| DPB=1 | | | hI0 | hI0 | hI0 | hP0 | hP0 | hP0 | hP1 | hP1 | hP1 | .. |
| DPB>=1.5 | | | | | | hI0 | hI0 | hI0 | hP0 | hP0 | hP0 | .. |
| DPB==2 | | | | | | | | | hI0 | hI0 | hI0 | .. |

FIG. 9

| Method: discard oldest | IBrBPBrBP.. frame stream, 4 ref. frames. | | | | | | | | | | |
|---|---|---|---|---|---|---|---|---|---|---|---|
| decode | I0 | P0 | Br0 | B0 | P1 | Br1 | B1 | P2 | Br2 | B2 | P3 | .. | RF DRIFT |
| display (delayed) | | I0 | Br0 | B0 | P0 | Br1 | B1 | P1 | Br2 | B2 | P2 | .. | |
| Rec. min. | | I0 | P0 | Br0 | P0 | P1 | Br1 | P1 | P2 | Br2 | P2 | .. | |
| DPB=2 | | | I0 | P0 | I0 | P0 | P1 | P0 | P1 | P2 | P1 | .. | |
| DPB>=3 buffer | | | | I0 | | I0 | P0 | I0 | P0 | P1 | P0 | .. | |
| DPB==4 buffer | | | | | | I0 | | I0 | P0 | | .. | No drift |

FIG. 10

| Min temp accumulation then _oldest_ | | | | | IBrBPBrBP.. frame stream, 4 ref. frames. | | | | | | | |
|---|---|---|---|---|---|---|---|---|---|---|---|---|
| Decode | I0 | P0 | Br0 | B0 | P1 | Br1 | B1 | P2 | Br2 | B2 | P3 | .. | RF DRIFT |
| display (delayed) | | I0 | Br0 | B0 | P0 | Br1 | B1 | P1 | Br2 | B2 | P2 | .. | |
| DPB=3 | | I0 | P0 | Br0 | P0 | P1 | hBr1 | P1 | P2 | Br2 | P2 | .. | |
| | | | I0 | P0 | I0 | P0 | P1 | P0 | P1 | P2 | P1 | .. | |
| | | | | I0 | | I0 | P0 | hI0 | hP0 | hP1 | hP0 | .. | |
| | | | | | | hI0 | | hI0 | hP0 | | .. | |

FIG. 11

| Reduce all half-horizontal resolution & discard oldest | | | | | IBrBPBrBP.. frame stream, 4 ref. frames. | | | | | | | |
|---|---|---|---|---|---|---|---|---|---|---|---|---|
| Decode | I0 | P0 | Br0 | B0 | P1 | Br1 | B1 | P2 | Br2 | B2 | P3 | .. | RF DRIFT |
| display (delayed) | | hI0 | hBr0 | hB0 | hP0 | hBr1 | hB1 | hP1 | hBr2 | hB2 | hP2 | .. | |
| Rec. min. DPB=1 | | hI0 | hP0 | hBr0 | hP0 | hP1 | hBr1 | hP1 | hP2 | hBr2 | hP2 | .. | |
| | | | hI0 | hP0 | hI0 | hP0 | hP1 | hP0 | hP1 | hP2 | hP1 | .. | |
| DPB>=1.5 | | | | hI0 | | hI0 | hP0 | hI0 | hP0 | hP1 | hP0 | .. | |
| DPB==2 | | | | | | | hI0 | | hI0 | hP0 | | .. | none |

FIG. 12

DPB=3: non-Bluray: RF drift potential after B2. Blu-ray: after P2.

| Method: discard oldest | | | | | | | H.264 'IBBrBP-frame stream', 4 ref. frames. | | | | | | |
|---|---|---|---|---|---|---|---|---|---|---|---|---|---|
| decode | I0 | P0 | Br0 | B0 | B1 | P1 | Br1 | B2 | B3 | P2 | Br2 | B4 | B5 | P3 | .. |
| display (dly) | | | I0 | B0 | Br0 | B1 | P0 | B2 | Br1 | B3 | P1 | B4 | Br2 | B5 | P2 .. |
| Rec. min. DPB=3 | | I0 | P0 | Br0 | Br0 | B1 | P1 | Br1 | Br1 | B3 | P2 | Br2 | Br2 | B5 | .. |
| | | | I0 | P0 | P0 | P0 | P0 | P1 | P1 | P1 | P1 | P2 | P2 | P2 | .. |
| DPB=4 | | | | I0 | I0 | I0 | I0 | P0 | P0 | P0 | P0 | P1 | P1 | P1 | .. |
| | | | | | | | | I0 | I0 | I0 | I0 | P0 | P0 | P0 | No drift |

FIG. 13

FIG. 14 potential resolution reduction drift for decoded frames >= P2 (with Bluray restrictions). Without Bluray restrictions, for decoded frames >=B2.

| dynamically reduce *oldest* half-horizontal resolution | H.264 'IBBrBP-frame stream', 4 ref. frames. | | | | | | | | | | | | |
|---|---|---|---|---|---|---|---|---|---|---|---|---|---|
| Decode | I0 | P0 | Br0 | B0 | B1 | Br1 | B2 | B3 | P2 | Br2 | B4 | B5 | P3 | .. |
| display (dly) |  | I0 | B0 | Br0 | B1 | P0 | B2 | Br1 | B3 | P1 | B4 | Br2 | B5 | .. |
| DPB=3.5 | I0 | P0 | Br0 | Br0 | Br0 | Br1 | Br1 | Br1 | P2 | Br2 | Br2 | Br2 | B5 | .. |
|  |  | I0 | P0 | P0 | P0 | P1 | P1 | P1 | P1 | P2 | P2 | P2 | P2 | .. |
|  |  |  | I0 | I0 | I0 | P0 | P0 | P0 | P0 | P1 | P1 | P1 | P1 | .. |
|  |  |  |  |  |  | hI0 | hI0 | hI0 | hI0 | hP0 | hP0 | hP0 | hP0 | .. |

FIG. 15

Note: no drift in P-frames. Only in B-frames. No accumulation past a P-frame in this example. Note: this example can be done without dynamic memory reduction. Ie. sub-sampled storage is enough. Note for DPB=3.5 hI0 is only used for Br2 decode ie. won't accumulate far.

| half-horizontal resolution: min temporal errors *accumulation/drift* | H.264 'IBBrBP-frame stream', 4 ref. frames. | | | | | | | | | | | | |
|---|---|---|---|---|---|---|---|---|---|---|---|---|---|
| Decode | I0 | P0 | Br0 | B0 | B1 | Br1 | B2 | B3 | P2 | Br2 | B4 | B5 | P3 | .. |
| display (dly) |  | I0 | B0 | Br0 | B1 | P0 | B2 | hBr1 | hB3 | P1 | B4 | hBr2 | hB5 | .. |
| DPB=3.5 | I0 | P0 | Br0 | Br0 | Br0 | hBr1 | hBr1 | hBr1 | hB3 | hBr2 | hBr2 | hBr2 | hB5 | .. |
|  |  | I0 | P0 | P0 | P0 | P1 | P1 | P1 | P1 | P2 | P2 | P2 | P2 | .. |
|  |  |  | I0 | I0 | I0 | P0 | P0 | P0 | P0 | P1 | P1 | P1 | P1 | .. |
|  |  |  |  |  |  | I0 | hI0 | hI0 | hI0 | P0 | P0 | P0 | P0 | .. |

FIG. 16

Min temporal *accumulation/drift then oldest* — H.264 'IBBrBP-frame stream', 4 ref. frames.

| decode | I0 | P0 | Br0 | B0 | B1 | P1 | Br1 | B2 | B3 | P2 | Br2 | B4 | B5 | P3 | .. |
|---|---|---|---|---|---|---|---|---|---|---|---|---|---|---|---|
| display (dly) |  | I0 | P0 | Br0 | B0 | B1 | P1 | B2 | hBr1 | hBr1 | P1 | B4 | hBr2 | hBr2 | .. |
| | | | | | | | | | hBr1 | hB3 | P2 | P1 | hBr2 | hBr2 | .. |
| DPB=3 | I0 | P0 | Br0 | Br0 | Br0 | Br0 | P1 | P1 | P1 | P1 | hP0 | P2 | P2 | P2 | .. |
| | | I0 | P0 | P0 | P0 | P0 | P0 | P0 | P0 | hP0 | hI0 | hI0 | P1 | P1 | .. |
| | | | I0 | I0 | I0 | I0 | I0 | hI0 | hI0 | hI0 | hI0 | hP0 | hP0 | hP0 | .. |

FIG. 17

Resolution reduction drift for >=I0 for all examples. Reference frame drift as for 'discard oldest' example.

Method: reduce all half-horizontal resolution & discard — H.264 'IBBrBP-frame stream', 4 ref. frames.

| Decode | I0 | P0 | Br0 | B0 | B1 | P1 | Br1 | B2 | B3 | P2 | Br2 | B4 | B5 | P3 | .. |
|---|---|---|---|---|---|---|---|---|---|---|---|---|---|---|---|
| display (dly) |  | hI0 | hP0 | hBr0 | hBr0 | hB1 | hB1 | hP1 | hBr1 | hBr1 | hB3 | hP2 | hBr2 | hBr2 | hB5 | .. |
| Rec. min. | hI0 | hP0 | hBr0 | hP0 | hP0 | hP0 | hP0 | hP1 | hP1 | hP1 | hP1 | hP2 | hP2 | hP2 | hB5 | .. |
| DPB=1.5 |  | hI0 | hI0 | hI0 | hI0 | hI0 | hI0 | hP0 | hP0 | hP0 | hP0 | hP1 | hP1 | hP1 | hP2 | .. |
| DPB==2 |  |  |  |  |  |  | hI0 | hI0 | hI0 | hI0 | hI0 | hP0 | hP0 | hP0 | hP1 | .. |
| |  |  |  |  |  |  |  |  |  |  |  | hI0 | hI0 | hI0 | hP0 | .. |

US 7,801,223 B2

METHOD FOR VIDEO DECODER MEMORY REDUCTION

FIELD OF THE INVENTION

The present invention relates to video decoding generally and, more particularly, to a method for video decoder memory reduction.

BACKGROUND OF THE INVENTION

As the market for video decoders matures, a cost and size of the memory used to buffer pictures in the decoding process is becoming an important factor. Conventional techniques used to reduce the decoding memory for MPEG-2 compliant bitstreams are (i) dropping B-frames and (ii) storing reference frames at a reduced resolution. However, the conventional solutions are far from optimal in terms of a quality versus a memory tradeoff for an H.264-compliant decode. Unlike MPEG-2 and other prior standards, the H.264 decode permits (i) multiple reference frames, (ii) mandatory storage of non-reference pictures for reordering delay only (and not for use as references), (iii) very flexible picture patterns (i.e., Groups of Pictures), (iv) hierarchical Groups of Pictures and (v) reference B-frames.

SUMMARY OF THE INVENTION

The present invention concerns a method for video decoding. The method generally comprises the steps of (A) decoding a first picture from a bitstream, the first picture having a first resolution, (B) storing the first picture at the first resolution in a memory and (C) storing the first picture at a second resolution in the memory, wherein the second resolution is lower than the first resolution.

The objects, features and advantages of the present invention include providing a method for video decoder memory reduction that may (i) reduce a size of a decoded picture buffer, (ii) minimize potential drift and/or error due to resolution reduction of reference pictures, (iii) minimize potential drift and/or error due to missing reference pictures and/or (iv) provide a better tradeoff of a memory size versus a decoded video quality compared with conventional techniques.

BRIEF DESCRIPTION OF THE DRAWINGS

These and other objects, features and advantages of the present invention will be apparent from the following detailed description and the appended claims and drawings in which:

FIG. 2 is a table for a first example decoding sequence discarding the oldest reference pictures;

FIG. 3 is a table for the first example decoding sequence dynamically reducing the oldest reference pictures from a first buffer size;

FIG. 4 is a table for the first example decoding sequence dynamically reducing the oldest reference pictures from a second buffer size;

FIG. 5 is a table for the first example decoding sequence reducing all reference pictures and discarding the oldest reference pictures;

FIG. 6 is a table for a second example decoding sequence discarding the oldest reference pictures;

FIG. 7 is a table for the second example decoding sequence dynamically reducing the oldest reference pictures from a first buffer size;

FIG. 8 is a table for the second example decoding sequence dynamically reducing the oldest reference pictures from a second buffer size;

FIG. 9 is a table for the second example decoding sequence reducing all reference pictures for storage and discarding the oldest reference pictures;

FIG. 10 is a table for a third example decoding sequence discarding the oldest reference pictures;

FIG. 11 is a table for the third example decoding sequence temporarily accumulating reference B-pictures and discarding the oldest reference pictures;

FIG. 12 is a table for the third example decoding sequence reducing all reference pictures and discarding the oldest reference pictures;

FIG. 13 is a table for a fourth example decoding sequence discarding the oldest reference pictures;

FIG. 14 is a table for the fourth example decoding sequence dynamically reducing the oldest reduced-resolution reference pictures;

FIG. 15 is a table for the fourth example decoding sequence reducing some reference pictures, minimizing temporal errors and temporarily accumulating;

FIG. 16 is a table for the fourth example decoding sequence reducing some reference pictures, minimizing temporal accumulation and discarding the oldest reference pictures;

FIG. 17 is a table for the fourth example decoding sequence reducing all reference pictures and discarding the oldest reference pictures;

DETAILED DESCRIPTION OF THE PREFERRED EMBODIMENTS

Figure 1:
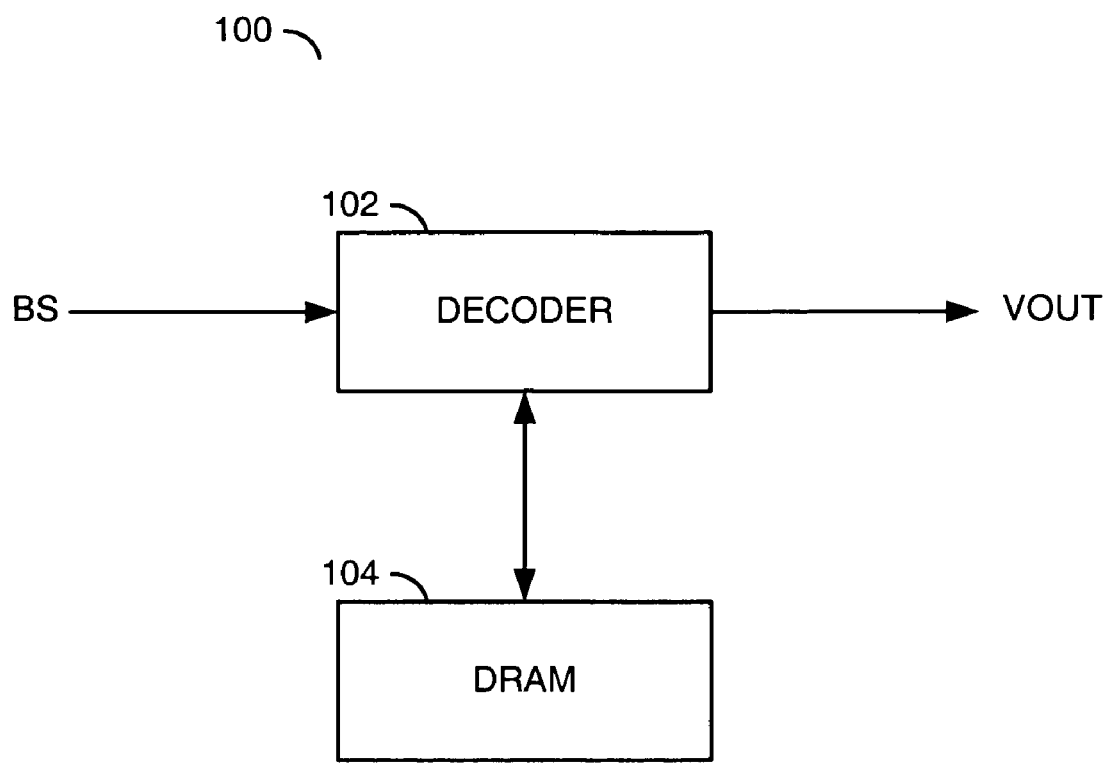
FIG. 1 is a block diagram of a circuit in accordance with a preferred embodiment of the present invention.

Referring to FIG. 1, a block diagram of a circuit 100 is shown in accordance with a preferred embodiment of the present invention. The circuit (or system) 100 may be referred to as a media processor circuit. The media processor circuit 100 generally comprises a circuit (or module) 102 and a circuit (or module) 104. An input signal (e.g., BS) may be received by the circuit 102. An output signal (e.g., VOUT) may be generated and presented by the circuit 102. The circuit 102 and the circuit 104 may be in communication with each other to exchange data.

The signal BS may be a compressed video signal, generally referred to as a bitstream. The signal BS may comprise a sequence of progressive-format frames and/or interlace-format fields. The signal BS may be compliant with a VC-1, MPEG and/or H.26x standard. The MPEG/H.26x standards generally include H.261, H.264, H.263, MPEG-1, MPEG-2, MPEG-4 and H.264/AVC. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The signal VOUT may be one or more analog video signals and/or one or more digital video signals. The signal VOUT generally comprises a sequence of progressive-format frames and/or interlace-format fields. The signal VOUT may include synchronization signals suitable for synchronizing a display with the video information. The signal VOUT may be generated in analog form as, but is not limited to, an RGB (Red, Green, Blue) signal, an EIA-770 (e.g., YCrCb) signal, an S-video signal and/or a Composite Video Baseband Signal (CVBS). In digital form, the signal VOUT may be generated as, but is not limited to, a High Definition Multimedia Interface (HDMI) signal, a Digital Video Interface (DVI) signal and/or a BT.656 signal. The signal OUT may be formatted as a standard definition signal or a high definition signal.

The circuit 102 may be referred to as a decoder circuit. The decoder circuit 102 may be operational to decode and format the video information received in the signal BS to generate the signal VOUT. Decoding may be compatible with the VC-1, MPEG and/or H.26x standards.

The circuit 104 may be referred to as a memory circuit. The memory circuit 104 may be operational to temporarily buffer frames/fields (pictures) and other information used in decoding and formatting the digital video and audio data. A buffering region within the memory circuit 104 used to buffer decoded pictures may be referred to as a decoded picture buffer (DPB). The memory circuit 104 may be implemented as a single data rate (SDR) dynamic random access memory (DRAM) or a double data rate (DDR) DRAM. Other memory technologies may be implemented to meet the criteria of a particular application.

A size reduction of the DPB may use one or more of the techniques as follows. In some embodiments, the decoder circuit 102 may first store a picture (e.g., PIC1) into the memory circuit 104 at normal resolution (e.g., RESA) and later store the picture PIC1 to the memory circuit 104 at a different resolution (e.g., RESB). Generally, the normal-resolution RESA is greater than the RESB. For example, the resolution RESA may be a full resolution of the decoded pictures. The resolution RESB may be a half-horizontal resolution, a half-vertical resolution, a half-horizontal and half-vertical resolution or another reduced resolution.

In other embodiments, the decoder circuit 102 may not write all of the reference pictures that may be indicated as appropriate for reconstruction/decoding of other pictures. When a reference picture is missing from the memory circuit 104, an error concealment technique may be utilized to create a replacement reference picture for using in the decoding.

In still other embodiments, the decoder circuit 102 generally writes (and/or resizes) pictures held for reordering delay purposes at a reduced resolution. The "reduction" may be relative to a normative decoding resolution/process (e.g., the H.264 standard decoding process for a particular bitstream syntax). After the reduced pictures are read from the memory circuit 104 and before being displayed, the reduced pictures may be upsampled to restore the normative resolution.

In other embodiments, the decoder circuit 102 may be operational to write only some of the pictures at a reduced resolution. The remaining decoded pictures may be buffered in the memory circuit 104 at the normal (full) resolution.

Referring to FIGS. 2-21, the acronym RR may refer to a condition where potential drifting and/or errors may be introduced while decoding a picture due to a reference picture being stored in the DPB (e.g., the memory circuit 104) at a reduced resolution. The acronym FR may refer to a condition where potential drifting and/or errors may be introduced while decoding a picture due to a missing reference picture previously released/overwritten/deleted from the DPB. The acronym HHR may refer to a condition where a picture is stored in the DPB at a half-horizontal resolution. In some embodiments, the DPB may have storage for one additional full-resolution picture to receive and buffer the current picture being decoded prior to display. In other embodiments, the DPB may have additional storage for at least two extra macroblock rows to receive and buffer the current picture rows prior to display.

Referring to FIG. 2, a table for a first example decoding sequence discarding the oldest reference pictures is shown. The example decoding sequence illustrates an intra-picture ("I") followed by a sequence of predicted pictures ("P") or and an instantaneous decoding refresh (IDR) picture access point (e.g., a start of a Group of Pictures (GOP)). The example sequence of pictures may be a stream comprising I P P P . . . Decoding of the P-pictures may use up to four reference pictures. A display delay (row 132) may be (i) at least 2 macroblock rows behind the decode for H.264 streams with macroblock adaptive field/frames and (ii) at least one macroblock row behind the decode in most other cases. Storage of the decoded pictures into the DPB is generally performed at full resolution in the example.

The decoding sequence generally starts in a column 110 where an initial I-picture (e.g., I0) is (i) decoded (row 130) and (ii) is displayed (row 132) after a short delay. In a column 112, (i) the picture I0 may be stored in the DPB (row 134), (ii) an initial P-picture (e.g., P0) may be decoded (row 130) utilizing the picture I0 as a reference picture and (iii) the picture P0 may be displayed (row 132). Since the picture I0 is available in the DPB, the decoded picture P0 generally does not experience any drift and/or errors due to a missing reference frame (e.g., no RF induced distortion).

In a column 114, (i) the picture P0 may be stored in the DPB (row 132) as a reference picture, (ii) a new P-picture (e.g., P1) may be decoded (row 130) using one or more of the reference pictures (e.g., I0 and/or P0) from the DPB and (iii) the picture P1 may be displayed (row 132). If the DSP is sized to hold two or more full-resolution reference pictures (rows 136, 138 and 140), all potential reference pictures are available for decoding the picture P1 and no missing picture drift may be experienced in the picture P1. If the DPB is sized to hold less than two full-resolution reference pictures (row 134), the picture P1 may experience some minor drift/error as the oldest reference picture I0 may have been released from the DPB and/or overwritten by the reference picture P0.

In a column 116, (i) the picture P1 may be stored in the DPB (row 132) as a reference picture, (ii) a new P-picture (e.g., P2) may be decoded (row 130) using one or more of the reference pictures (e.g., I0, P0 and/or P1) from the DPB and (iii) the picture P2 may be displayed (row 132). If the DPB is sized to hold at least three full reference pictures (rows 138 and 140), decoding of the picture P2 may have all three reference pictures available. If the DPB is sized to hold less than three full reference pictures (rows 134 and 136), the picture P2 may experience some limited drift and/or error if either or both of the reference pictures I0 and/or P0 were discarded as the oldest reference pictures.

In a column 118, (i) the picture P2 may be stored in the DPB (row 132) as a reference picture, (ii) a new P-picture (e.g., P3) may be decoded (row 130) using one or more of the reference pictures (e.g., I0, P0, P1 and/or P2) from the DPB and (iii) the picture P3 may be displayed (row 132). If the DPB has sufficient available space to hold all four reference pictures (row 140), no drifting and/or errors may be introduced to the decoding of the picture P3 due to a missing reference picture. If the DPB is sized to store less than four full-resolution reference pictures (rows 134, 136 and 138), the picture P3 may experience some small drifting/errors due to a potentially missing reference picture.

In a column 120, (i) the reference picture I0 (if still in the DPB) may be discarded or released to make room for a newer reference picture, (ii) the picture P3 may be stored in the DPB (row 132) as a reference picture, (iii) a next P-picture (e.g., P4) may be decoded (row 130) using one or more of the reference pictures (e.g., P0, P1, P2 and/or P3) and (iv) the picture P4 may be displayed (row 132). No missing-reference-picture induced drift/errors may occur in the picture P4 if the DPB is sufficiently large to hold four or more full-resolution reference pictures (row 140). Otherwise, the older reference pictures may have been discarded (rows 134, 136 and 138) causing possible slight drift/error in the picture P4.

In a column 122, (i) the reference picture P0 may be discarded, (ii) the picture P4 may be stored in the DPB (row 132) as a reference picture, (iii) a new P-picture (e.g., P5) may be decoded (row 130) using the available reference pictures (e.g., P1, P2, P3 and/or P4) in the DPB and (iv) the picture P5 may be displayed (row 132). As with the picture P4, the picture P5 may not have a missing-reference-picture induced drift/error if the DPB is sized to hold at least four full-resolution reference pictures (row 140). If the DPB capacity holds less than four reference pictures (rows 134, 136 and 138), some limited drift/error may be introduced in the decoding of the picture P5 due to the missing reference pictures.

Referring to FIG. 3, a table for the first example decoding sequence dynamically reducing a resolution of the oldest reference pictures is shown. The example sequence of pictures may be a stream comprising I P P P . . . Decoding of the P-pictures may use up to four reference pictures. The DPB in the example may be sized to hold up to three full-resolution reference pictures.

In the columns 110-116, the pictures I0, P0, P1 and P2 may be decoded and displayed as shown before in FIG. 2. No drifting or errors may be introduced during decode due to missing reference pictures as the DPB may hold at least three full-resolution reference pictures. In a column 150, (i) the reference pictures I0 and P0 may be reduced (rows 156 and row 158) to occupy the same space as a single full-resolution reference picture, (ii) the picture P2 may be stored in the DPB (row 134) as a full-resolution reference picture, (iii) the picture P3 may be decoded (row 130) and (iv) the picture P3 may be displayed (row 132). Since the decoding of the picture P3 may rely on a reduced-resolution reference picture (e.g., hI0 and/or hP0), some small drift and/or error may be introduced into the picture P3.

In the column 152, room for a newest reference picture may be opened by (i) discarding the reduced picture I0 (e.g., hI0) from the DPB and (ii) reducing the reference picture P1 (row 156) such that the reduced picture P1 (e.g., hP1) and the reduced picture P0 (e.g., hP0) consume the space of a single full-resolution picture (rows 156 and 158). Next, (iii) the picture P3 may be stored in the DPB (row 134), (iv) the picture P4 may be decoded and (v) the picture P4 may be displayed. Since the decoding of the picture P4 may rely on a reduced-resolution reference picture (e.g., hP0 and/or hP1), some minor drift and/or error may be introduced into the picture P4. Decoding of the picture P5 may proceed (column 154) in the same way as the picture P4.

Referring to FIG. 4, a table for the first example decoding sequence dynamically reducing the oldest reference pictures is shown. The example sequence of pictures may be a stream comprising I P P P . . . Decoding of the P-pictures may use up to four reference pictures. The DPB in the example may be sized to hold up to 2.5 full-resolution reference pictures. Other sized of the DPB (e.g., 3.5 full-resolution reference pictures) may follow the same technique.

In the columns 110-114, the pictures I0, P0 and P1 may be decoded, displayed and stored in the DPB as before. In a column 160, (i) the reference picture I0 may be downsampled (e.g., hI0) to fit into a one-half full-resolution space (row 170), (ii) the reference picture P1 may be stored in the DPB (row 134), (iii) the picture P2 may be decoded (row 130) using one or more of the reference pictures hI0, P1 and/or P2, (iv) the picture P2 may then be displayed (row 132). Since the decoding of the picture P2 potentially uses the reduced-resolution reference picture hI0, some limited drift and/or error may exist in the picture P2.

In a column 162, room for a newest reference picture may be opened in the DPB by (i) reducing the resolution of both of the reference picture P0 (row 168) and the reference picture P1 (row 170). In addition, (ii) the reference picture hI0 may remain in the DPB (row 172). Next, (iii) the picture P2 may be stored as a reference picture, (iv) the picture P4 decoded (row 130) and (v) the picture P4 displayed (row 132). Since three of the four possible reference pictures (e.g., hI0, hP0 and hP1) used to decode the picture P3 are stored in reduced resolution, the picture P3 may contain limited drift and/or errors.

In a column 164, (i) the reference picture hI0 may be discarded and (ii) the resolution of the reference picture P2 may reduced (e.g., hP2) to create space for a newer reference picture. Next (iii) the picture P3 may be stored in the DPB, (iv) the picture P4 may be decoded and (v) the picture P4 may be displayed. As before, the picture P4 may have slight potential drift and/or error due to three of the four reference pictures being stored in the DPB at reduced resolution. Decoding may continue in a column 166 with the P5 picture using the full-resolution reference picture P4 and the reduced-resolution reference pictures hP3, hP2 and/or hP1.

Referring to FIG. 5, a table for the first example decoding sequence reducing all reference pictures and discarding the oldest reference pictures is shown. The example sequence of pictures may be a stream comprising I P P P . . . Decoding of the P-pictures may use up to four reference pictures. The DPB is illustrated at different sizes.

Referring to FIG. 6, a table for a second example decoding sequence discarding the oldest reference pictures is shown. The second example sequence of pictures may be a stream I B B P B B . . . . In the example, the B-pictures are generally non-reference pictures. For a Blu-ray Disc™ H.264 embodiment, a B-picture may only reference immediately preceding/following I-pictures, P-pictures and/or reference B-pictures. A field picture GOP comprising I P B B B B P P B B B P P with complementary-field-pairs replacing pictures may also work in the examples that follow. Blu-ray Disc™ is a trademark of the Blu-ray Disc Association.

Referring to FIG. 7, a table for the second example decoding sequence dynamically reducing the oldest reference pictures is shown. The DPB may be sized to store 3 full-resolution reference pictures in the example. A slight potential for drift/error due to reduced reference pictures may exist starting at (i) the picture P3 and beyond under the Blu-ray criteria and (ii) the picture B4 and beyond without the Blu-ray criteria.

Referring to FIG. 8, a table for the second example decoding sequence dynamically reducing the oldest reference pictures is shown. The DPB may be sized to store 2.5 full-resolution reference pictures in the example. A DPB of other half-sizes (e.g., 3.5) may operate in a similar manner. A minor potential for drift/error due to reduced reference pictures may exist starting at (i) the picture P2 and beyond under the Blu-ray criteria and (ii) the picture B2 and beyond without the Blu-ray criteria.

Referring to FIG. 9, a table for the second example decoding sequence reducing all reference pictures for storage and discarding the oldest reference pictures is shown. Since all of the reference pictures are stored at reduced resolution, all pictures starting at P0 may have small reduced resolution induced drift/errors. The missing-reference-picture induced drift/errors may be similar to FIG. 6.

Referring to FIGS. 10-17, the terminology "B" may refer to a non-reference B-picture and "Br" may refer to a reference B-picture. The third example sequence comprising I Br B P Br B . . . is generally illustrated. For the Blu-ray H.264 criteria, the B-pictures may only reference immediately preceding/following I-pictures, P-pictures and reference Br-pictures.

Referring to FIG. 10, a table for a third example decoding sequence discarding the oldest reference pictures is shown. Referring to FIG. 11, a table for the third example decoding sequence temporarily accumulating reference B-pictures and discarding the oldest reference pictures is shown. Referring to FIG. 12, a table for the third example decoding sequence reducing all reference pictures and discarding the oldest reference pictures is shown.

Referring to FIG. 13, a table for a fourth example decoding sequence discarding the oldest reference pictures is shown. The fourth example sequence generally comprises the pictures I B Br B P B Br B . . . in a hierachical GOP. For a DPB of size 3 and non-Blu-ray criteria, a potential missing-reference-picture drift may exist after the picture B2. For the DPB size 3 with the Blu-ray criteria, the potential missing-reference-picture drift may exist after the picture P2.

Referring to FIG. 14, a table for the fourth example decoding sequence dynamically reducing the oldest reduced-resolution reference pictures is shown. With the Blu-ray criteria, a potential reduced-reference-picture drift may exist for decoded pictures starting with the picture P2. Without the Bluray criteria, the potential reduced-reference-picture drift may exist starting at decoded picture B2.

Referring to FIG. 15, a table for the fourth example decoding sequence reducing some reference picture, minimizing temporal errors and temporarily accumulating is shown. Generally, drift may be seen in the B-pictures but not in the P-pictures. No accumulation may be performed past a P-picture in the example. Furthermore, the example may be done without dynamic memory reduction as sub-sampled storage may be enough. For the DPB size of 3.5, the reference picture hI0 may only be used for decoding the picture Br2 so the reduced-resolution reference errors may accumulate only a short temporal distance.

Referring to FIG. 16, a table for the fourth example decoding sequence reducing some reference pictures, minimizing temporal accumulation and discarding the oldest reference pictures is shown. Referring to FIG. 17, a table for the fourth example decoding sequence reducing all reference pictures and discarding the oldest reference pictures is shown. Some reduced-reference-picture induced drift/error may occur for all pictures after the picture I0 for all examples. Missing-reference-picture drift/error may be caused by discarding the oldest reference pictures.

Based on the above descriptions, the media processor circuit 100 may provide solutions for a Blu-ray 1080-line interlaced, 4 reference picture decode that may have very little drift (visible error) most of the time. The drift may remain small even if only 3 reference pictures worth of storage/memory are used for the most common GOP structures. Several preferred solutions for DPB=3 pictures are show in bold in the FIGS. 2-17 for some of the most common GOP structures used for H.264, I P P P P . . . , I B B P B B P . . . , I Br B P Br B P Br B P . . . and I B Br B P B Br B P . . .

The following is an example set of rules to limit a "worst-case" influence from reducing the memory used in H.264 decodes, if appropriate for space considerations. Rule 1: Reduce non-reference pictures first since the non-reference pictures generally cause no temporal on-going drift. Rule 2: Reduce reference pictures with short (e.g., 1 or 2 pictures in either direction) temporal potential indirect influences on prediction/reconstruction to reduce the temporal duration of drift due to mismatches. Rule 3: Reduce the "oldest" reference pictures, or the reference pictures that may be temporally furthest from succeeding decoding pictures on the principal that reference pictures that are further away may be used less frequently (in general) for prediction/reconstruction. Rule 4: Take into account a memory bandwidth and a processing cost of downsizing pictures already present in the memory. If the memory bandwidth and/or processing cycles are scarce, try to reduce pictures that are currently being decoded so that (i) the reconstructed information may be stored at reduced resolution once, rather than (ii) stored at full resolution, read back, reduced in resolution and then written back to the memory. Rule 4 may take precedence over rules 1-3 according to the system bottlenecks. If a memory storage is a main system bottleneck, generally apply rules 1, 2, 3 in order. If one or both of the processing cycles and/or memory bandwidth are the main system bottlenecks, rule 4 may be considered until cycles/bandwidth are within budgets.

Figure 18:
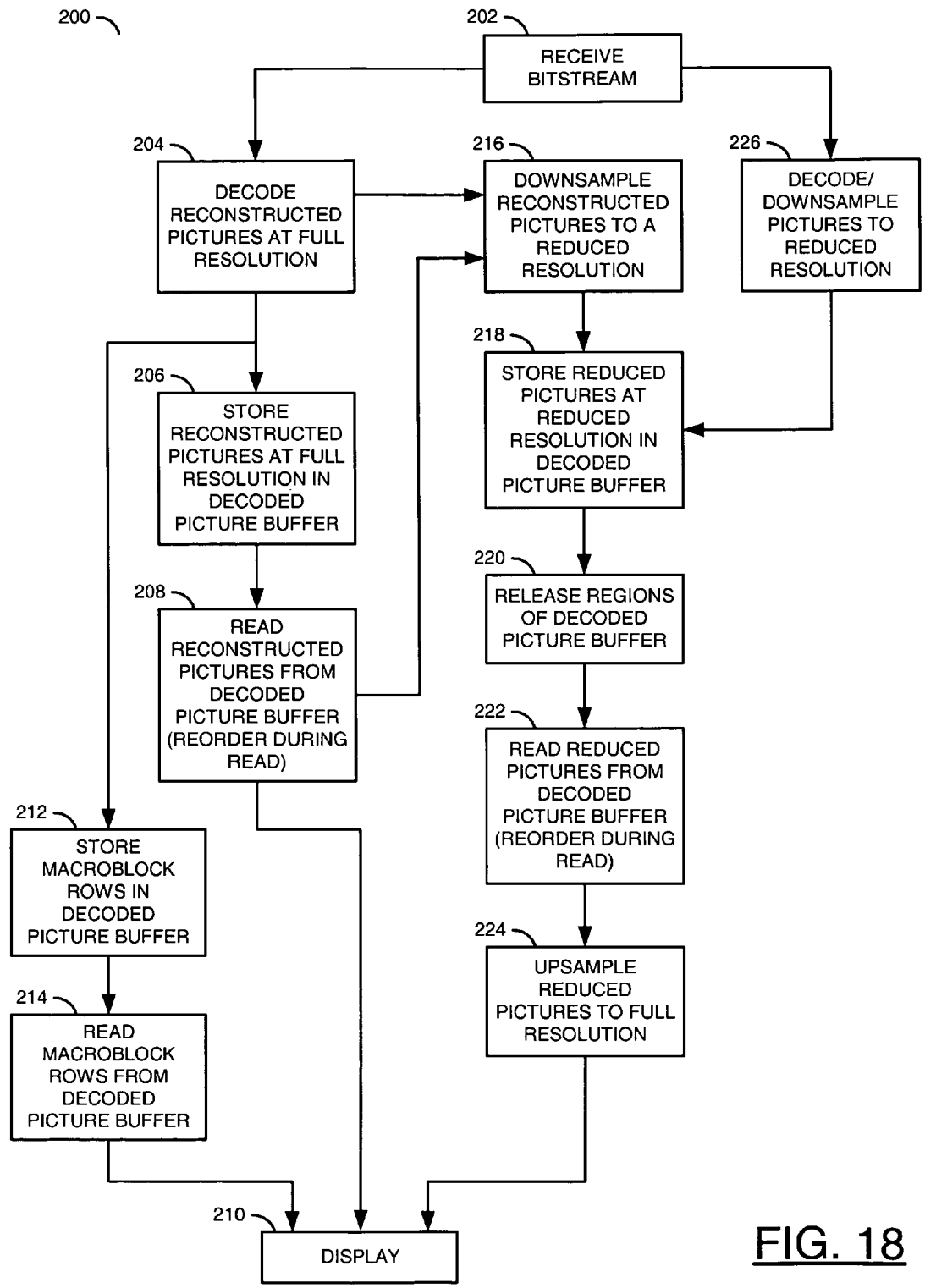
FIG. 18 is a flow diagram of a method for processing the pictures.

Referring to FIG. 18, a flow diagram of a method 200 for processing the pictures is shown. The method (or process) 200 generally comprises a step (or block) 202, a step (or block) 204, a step (or block) 206, a step (or block) 208, a step (or block) 210, a step (or block) 212, a step (or block) 214, a step (or block) 216, a step (or block) 218, a step (or block) 220, a step (or block) 222, a step (or block) 224 and a step (or block) 226.

The decoder circuit 102 may receive the encoded pictures in the signal BS at the step 202. In the step 204, the encoded pictures may be decoded by the decoder circuit 102 to generate reconstructed pictures at a full resolution. In some embodiments, the reconstructed pictures at the full resolution may be stored in the memory circuit 104 in the step 206. The reconstructed pictures may be read from the memory circuit 104 in a display sequence (which may be different from a decode sequence) in the step 208. In the step 210, the reconstructed picture may be displayed.

In some embodiments, storage of entire reconstructed pictures all at once may be avoided. In such cases, a few (e.g., two) macroblock rows of the full-resolution decoded pictures may be buffered in the memory circuit 104 as the picture is being decoded. Simultaneously with newer macroblock rows being stored, the older macroblock rows may be read from the memory circuit 104 in the step 214 and displayed in the step 210.

In some embodiments, the reconstructed pictures may be stored in the memory circuit 104 in a reduced-resolution format. For example, after a picture has been decoded at the full (normal) resolution, the picture may be downsampled in the step 216 and stored in the memory circuit 104 at the reduced resolution in the step 218. Sometimes, the reconstructed picture at the full resolution may already exist in the memory circuit 104 per step 206. Therefore, the reconstructed picture may be read from the memory circuit 104 in the step 208, downsampled in the step 216 and written back into the memory circuit 104 in the step 218. To avoid having two copies of the same reference picture in the memory circuit 104 simultaneously, the region previously occupied by the full-resolution picture may be released in the step 220. The releasing may occur before or after the reduced-resolution picture is written. In the step 220, the reduced-resolution reconstructed pictures may be read from the memory circuit 104 in a display order (which may be different from a write order). An upsampling of the reduced-resolution pictures may be performed in the step 224 to restore the pictures to the full resolution for display in the step 210.

In other embodiments, the decoding may be configured to perform both the reconstruction and downsampling of the pictures simultaneously. In the step 226, the reconstructed pictures may be generated directly at the reduced resolution (e.g., downsampled as part of a block filtering). The reduced-resolution pictures may then be stored in the step 216, read in the step 222, upsampled in the step 224 and displayed in the step 210.

Figure 19:
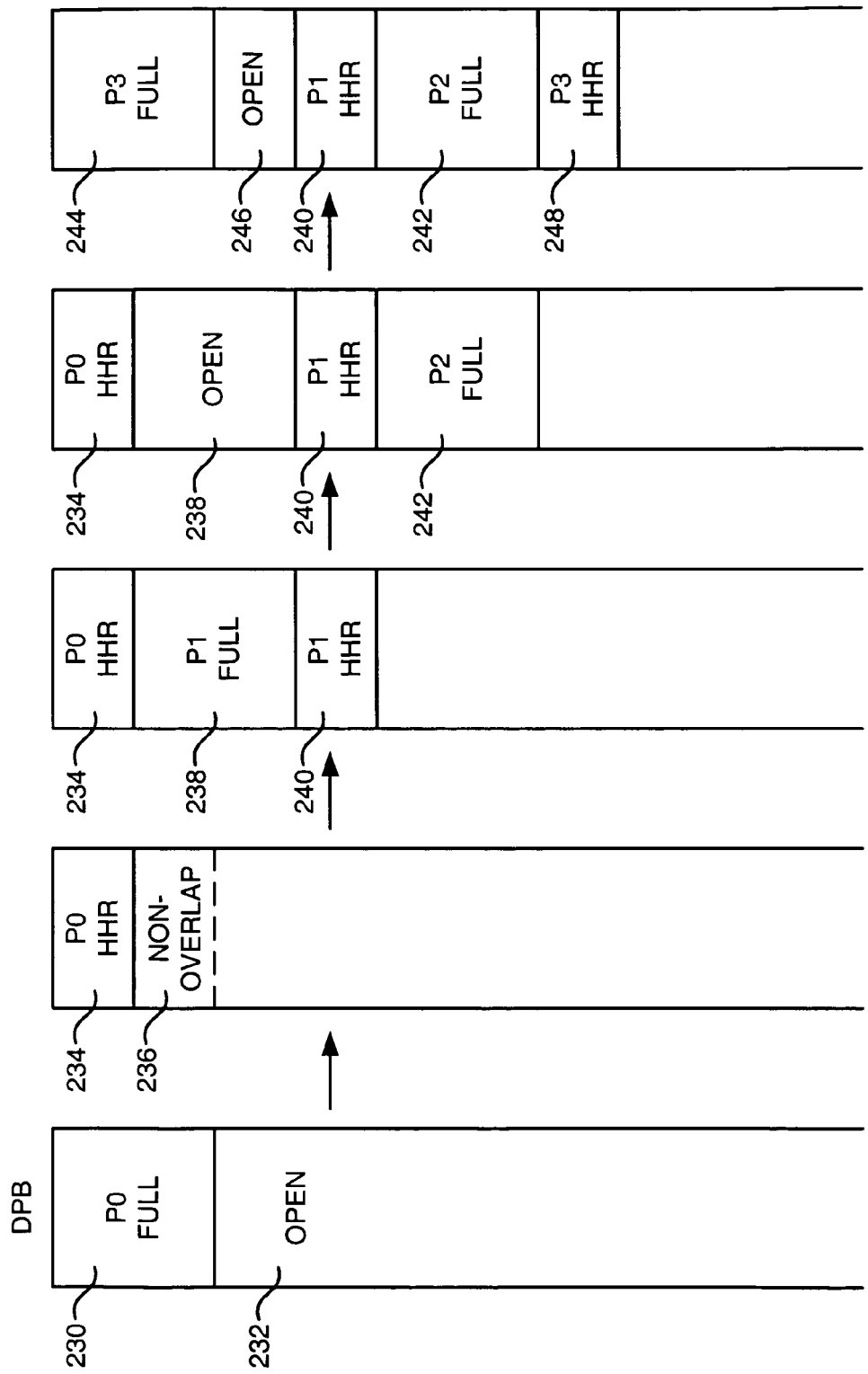
FIG. 19 is a diagram of sample writes and releases in a decoded picture buffer.

Referring to FIG. 19, a diagram of sample writes and releases in the decoded picture buffer (DPB) is shown. A first picture (e.g., P0 FULL) may be stored in the DPB in an area 230. The rest of the DPB in a region 232 may remain empty and available for use. To increase the available space in the DPB, the picture P0 may be downsampled to a half-horizontal resolution (e.g., P0 HHR) and stored in a first half of the area 230 (e.g., stored in the area 234). The second half of the area 230 (e.g., the area 236) where the reduced picture P0 HHR does not overlap the original picture P0 FULL may be released for later use.

A second full-resolution picture (e.g., P1 FULL) may be stored in the DPB in a region 238. The region 238 may overlap the unused region 236 left available when the picture P0 FULL was reduced. The P1 FULL may later be read from the DPB, downsampled and a reduced version (e.g., P1 HHR) written in the DPB in the area 240. With the picture P1 HHR available in the DPB, the area 238 holding the picture P1 FULL may be released (made available) for further use. A third full-resolution picture (e.g., P3 FULL) may be stored either in the released (open) area 238 or (as shown) stored in another region 242 in the DPB.

At some later time, the picture P0 HHR may be discarded freeing the space 234 for new pictures. Another new picture (e.g., P3 FULL) may be stored in the DPB in a space 244 comprising the old space 234 and a first half of the space 238. The second half of the open space 238 (e.g., space 246) may remain unused. The picture P3 FULL may also be stored in the DPB at a reduced resolution (e.g., P3 HHR) in either the space 246 or (as shown) in another area (e.g., area 248) in the DPB.

Figure 20:
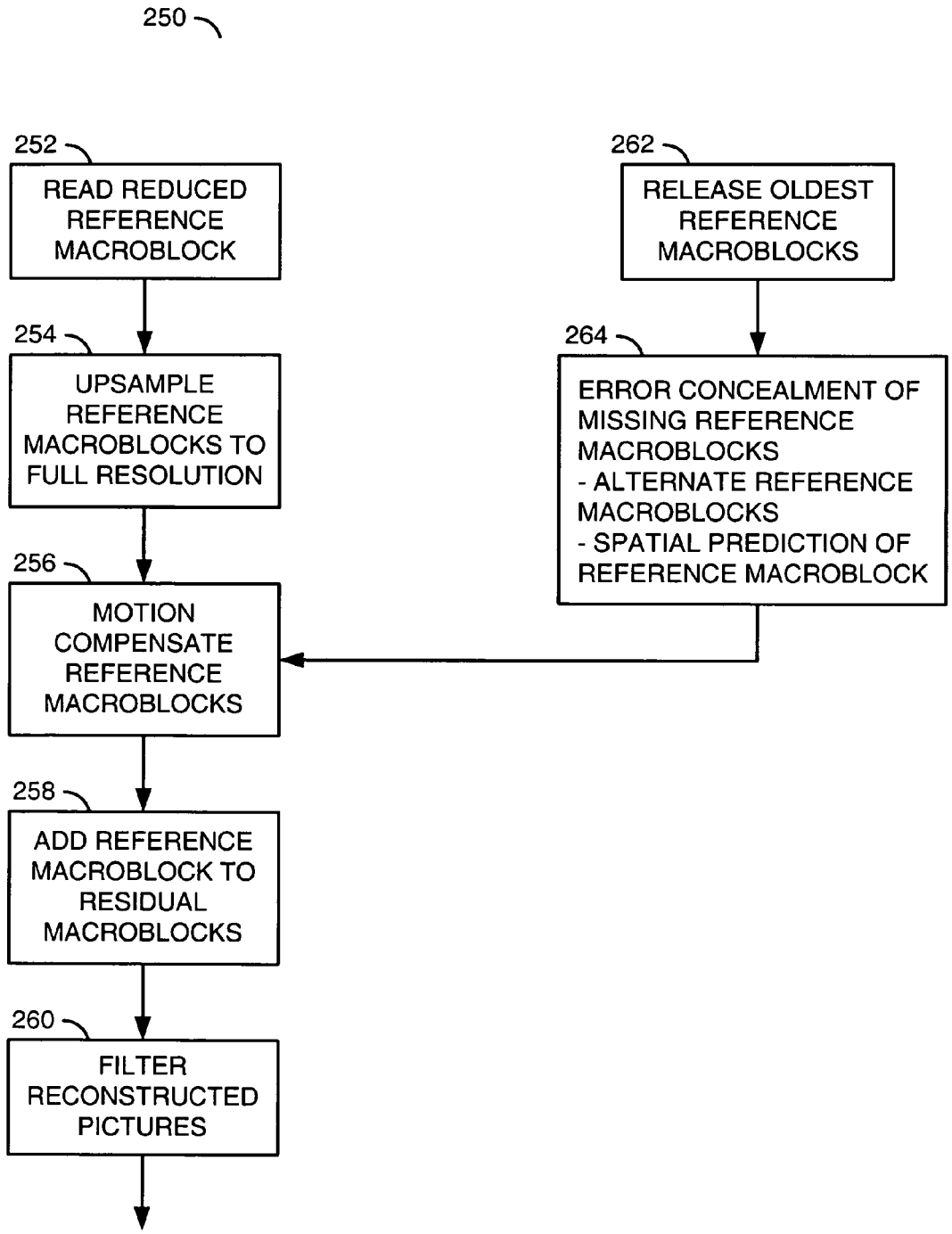
FIG. 20 is a flow diagram of an example method for processing reduced-resolution reference data.

Referring to FIG. 20, a flow diagram of an example method 250 for processing reduced-resolution reference data is shown. The method (or process) 250 generally comprises a step (or block) 252, a step (or block) 254, a step (or block) 256, a step (or block) 258, a step (or block) 260, a step (or block) 262 and a step (or block) 264. The method 250 may form sub-steps within the decode steps 204 and/or 226 shown in FIG. 18.

As residual macroblocks are reconstructed, associated reduced-resolution reference macroblocks may be read from the memory circuit 104 in the step 252. In the step 254, the reduced-resolution reference macroblocks may be upsampled to the full resolution. A motion compensation (e.g., sub-pixel interpolation) may be performed on the full-resolution reference macroblocks in the step 256. The motion compensated reference macroblocks may then be added to the residual macroblocks to generate reconstructed macroblocks in the step 258. The reconstructed macroblocks may be block filtered in the step 260 and then stored and/or displayed.

In some embodiments, one or more reference pictures may have been released from the memory circuit 104 before being used in the decoding (e.g., step 262). To compensate for the missing reference pictures, an error concealment technique may be used in the step 264 to create suitable replacements for the missing reference macroblocks. The error concealment techniques may include, but are not limited to, substituting data from an alternate reference picture for a missing reference picture and recreating a missing reference picture by spatial prediction from another picture. Other error concealment techniques may be implemented to meet the criteria of a particular application.

Figure 21:
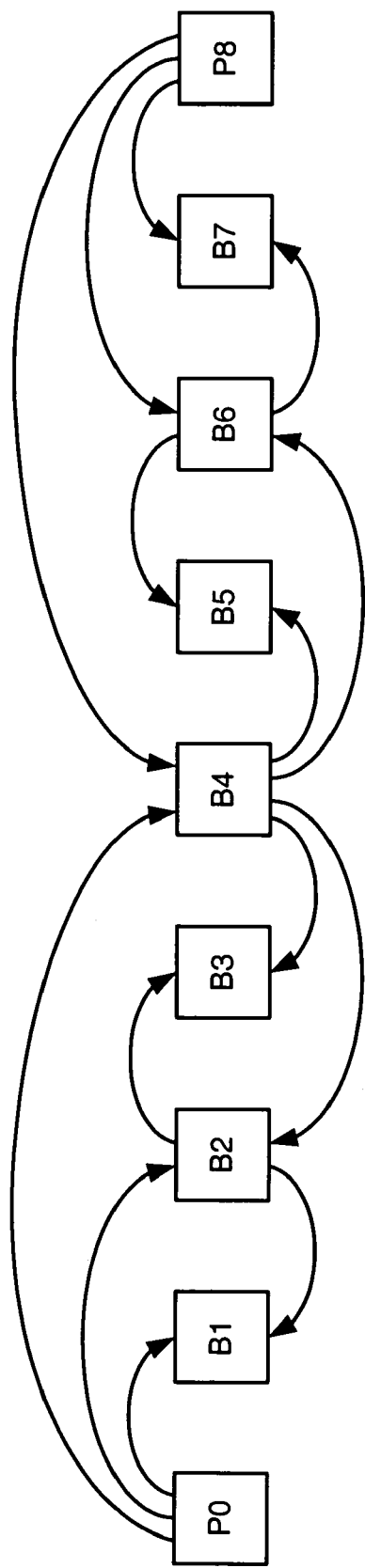
FIG. 21 is a diagram of an example sequence of pictures.

Referring to FIG. 21, a diagram of an example sequence of pictures is shown. The example sequence generally comprises P0 B1 B2 B3 B4 B5 B6 B7 P8. The picture P0 may be used as a reference picture for the pictures B1, B2 and B4. The picture P8 may be used as the reference picture for the pictures B7, B6 and B4. The picture B4 may be used as a reference picture for the pictures B3 and B5. The picture B2 may be a reference for the pictures B1 and B3. The picture B6 may be a reference for the pictures B5 and B7.

To minimize the use of the DPB, some of the reference pictures may be downsampled (downsized). In some embodiments, the oldest reference pictures may be downsized earlier. "Oldest" may be determined using any one or more of the following criteria (i) H.264 picture order count, (ii) time stamps, (iii) display order, (iv) decoding order, (v) H.264 frame number (e.g., frame_num), (vi) H.264 List 0 picture number (e.g., picNumL0), (vii) H.264 List 1 picture number (e.g., picNumL1) and (viii) whether the pictures are "short-term" reference pictures or "long-term" reference pictures. An example of a short-term reference picture may be the picture B1 that is only used for temporally adjacent picture B2. An example of a long-term reference picture may be the picture P0 that is used for decoding temporally distant picture P4.

In other embodiments, downsizing of the reference pictures may be performed based on a short temporal influence earlier. For example, reference B-pictures that are not used for prediction, even indirectly, by more than a few/couple of adjacent frames may be downsampled. In another example, P-pictures only used by Br-frames that are only used, even indirectly, for referencing a few/couple adjacent frames may be downsampled.

Resolution reduction may be used to conserve space in the DSP when reconstructed pictures are buffered for a display reordering (reorder delay). For example, some or all non-reference pictures subject to a reorder delay may be stored in the DPB at a reduced resolution. The pictures may then be upsampled to the full resolution just prior to being displayed. The "reduction" is generally relative to a normative decoding resolution/process (eg. the H.264 standard decoding process for a particular bitstream syntax). The non-reference pictures stored only for reordering delay purposes generally will not propagate drift to any other pictures if subsampled (reduced).

Downsampling may be applied to the reference pictures under various conditions. For example, reference pictures that are known to propagate drift/error short temporal distances may be prioritized for reduced-resolution storage. In particular, reference B-frames in Blu-ray streams may not propagate drift to more than the B-frames that follow in decoding order and that precede the next I-frame or P-frame in decoding order. More specifically, 2 additional frames at most may drift in addition to a downsampled reference B-frame, due to reference picture downsampling in Blu-ray streams.

In another example, reference pictures that may be known (by some process such as forward stream analysis) to contribute less to the prediction of other pictures may be downsampled. Furthermore, certain reference pictures that may introduce less distortion if reduced in resolution (e.g., already relatively blurry or not referenced for prediction by many other pixels in other pictures) may also be prioritized for reduced-resolution storage.

The functions performed by the diagrams of FIGS. 18 and 20 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for video decoding, comprising the steps of:
   (A) decoding a first picture from a bitstream with a decoder, said first picture having a first resolution;
   (B) storing said first picture in a memory at said first resolution;
   (C) reading said first picture from said memory at said first resolution;
   (D) generating a second picture at a second resolution by downsampling said first picture as read from said memory; and
   (E) storing said second picture in said memory, wherein (i) said second resolution is lower than said first resolution and (ii) both said first picture and said second picture reside in said memory at a first common time.

2. The method according to claim 1, further comprising the steps of:
   releasing a region of said memory storing said first picture after reading said first picture from said memory to allow a reduction of said memory; and
   storing a third picture in said memory using a portion of said region previously storing said first picture, said portion comprising a difference between (i) said first picture at said first resolution and (ii) said second picture at said second resolution.

3. The method according to claim 1, further comprising the step of:
   releasing a region of said memory storing said first picture at said first resolution in response to said first picture being an oldest reference picture among a plurality of reference pictures stored in said memory, wherein said oldest reference picture is determined based on at least one of (i) a picture order count, (ii) a time stamp, (iii) a display order, (iv) a decode order, (v) a frame number, (vi) a List 0 picture number, (vii) a List 1 picture number and (viii) a temporal distance from a current picture being decoded.

4. The method according to claim 1, further comprising the step of:
   releasing a region of said memory storing said first picture in response to both (i) said first picture being a non-reference B-picture and (ii) said first picture being subject to a reordering delay.

5. The method according to claim 1, further comprising the step of:
   releasing a region of said memory storing said first picture at said first resolution in response to both (i) said first picture comprising one of a plurality of reference pictures stored in said memory and (ii) said first picture does not influence decoding over a long temporal distance.

6. The method according to claim 1, further comprising the step of:
   decoding a third picture from said bitstream, wherein said first picture is read from, downsampled and stored in said memory as said second picture after said third picture has been decoded using said first picture as a reference picture.

7. The method according to claim 1, wherein (i) said decoding comprises an H.264 standard decoding, (ii) said memory comprises a dynamic random access memory, (iii) said first resolution comprises a full resolution and (iv) said second resolution comprises a half-horizontal resolution.

8. The method according to claim 1, further comprising the steps of:
   decoding a third picture from said bitstream;
   downsampling said third picture from said first resolution to said second resolution; and
   storing said third picture in said memory at said second resolution, wherein said second picture and said third picture reside in said memory at a second common time.

9. The method according to claim 8, further comprising the steps of:
   reading said third picture from said memory;
   upsampling said third picture from said second resolution to said first resolution; and
   decoding a fourth picture from said bitstream using said third picture at said first resolution as a reference picture.

10. The method according to claim 8, further comprising the steps of:
    determining a selection based on at least one of (a) available memory bandwidth of said memory, (b) available downsampling cycles and (c) available storage area in said memory; and
    generating said third picture at said second resolution by downsampling one of (i) said third picture at said first resolution not stored in said memory and (ii) said third picture at said first resolution stored in said memory as indicated by said selection.

11. A method for video decoding, comprising the steps of:
    (A) decoding a plurality of reference pictures from a bitstream with a decoder;

(B) storing said reference pictures in a memory;

(C) discarding a subset of said reference pictures from said memory; and (D) decoding a particular picture from said bitstream, wherein at least a given one of said reference pictures used to encode said particular picture is not stored in said memory while said particular picture is being decoded.

12. The method according to claim 11, wherein step (D) comprises the sub-step of:

decoding said particular picture using one of (i) an alternate reference picture in place of said given reference picture not stored in said memory and (ii) a spatial prediction of said given reference picture not stored in said memory.

13. The method according to claim 11, wherein step (C) comprises the sub-step of:

discarding from said memory an oldest of said reference pictures, wherein said oldest reference picture is determined based on at least one of (i) a picture order count, (ii) a time stamp, (iii) a display order, (iv) a decode order, (v) a frame number, (vi) a List 0 picture number, (vii) a List 1 picture number and (viii) a temporal distance from a current picture being decoded.

14. A method for video decoding, comprising the steps of:

(A) decoding a plurality of first pictures from a bitstream with a decoder, each of said first pictures having a first resolution;

(B) generating a plurality of second pictures by downsampling a subset of said first pictures, each of said second pictures (i) having a second resolution lower than said first resolution and (ii) is a B-picture subject to a reordering delay;

(C) storing (i) said second pictures and (ii) said first pictures not downsampled in a memory; and (D) reordering a sequence of said second pictures prior to display.

15. The method according to claim 14, further comprising the steps of:

decoding a plurality of reference pictures from said bitstream;

generating a plurality of reduced reference pictures by downsampling said reference pictures;

storing said reduced reference pictures in said memory; and upsampling said reduced reference pictures for use in decoding said first pictures.

16. A method for decoding video, comprising the steps of:

(A) decoding a plurality reconstructed pictures from a bitstream with a decoder, said reconstructed pictures comprising a plurality of first pictures having a first resolution and a plurality of second pictures having said first resolution;

(B) generating a plurality of third pictures at a second resolution by downsampling said second pictures, said second resolution being lower than said first resolution; and (C) storing both (i) said first pictures and (ii) said third pictures in a memory such that (a) at least one of said first pictures and at least one of said third pictures reside in said memory at a common time and (b) said second pictures corresponding to said at least one third picture are absent from said memory at said common time.

17. The method according to claim 16, wherein said second pictures comprise a plurality of non-reference pictures subject to a reordering delay.

18. The method according to claim 16, wherein said second pictures comprise a reference picture that does not influence decoding over a long temporal distance.

19. The method according to claim 16, wherein said second pictures comprise a reference picture that at least one of (i) is used in decoding a small number of said reconstructed pictures and (ii) introduces a small distortion in decoding said reconstructed pictures.

20. The method according to claim 16, wherein said second pictures comprise:

a plurality of non-reference pictures subject to a reordering delay; and a reference picture used in decoding said non-reference pictures.

21. The method according to claim 16, wherein said reconstructed pictures further comprise a plurality of reference pictures, the method further comprising the steps of:

storing at least one of said second pictures in said memory;

storing a subset of said reference pictures in said memory, wherein at least one of said reference pictures used to encode a particular one of said reconstructed pictures is not available in said decoder while said particular picture is being decoded; and reordering a sequence of said third pictures prior to display.

22. The method according to claim 14, further comprising the steps of:

reading an alternate reference picture from said memory in response to an original reference picture being unavailable in said decoder; and decoding a third picture from said bitstream using said alternate reference picture in place of said original reference picture, wherein said third picture was encoded using said original reference picture.

* * * * *